(12) United States Patent  
Lucey et al.

(10) Patent No.: US 8,364,133 B1  
(45) Date of Patent: Jan. 29, 2013

(54) METHOD AND APPARATUS FOR MANAGING PRIVATE MODERATOR CODES FOR CONFERENCE CALLS

(75) Inventors: Christina Evelyn Lucey, San Francisco, CA (US); Irina Mikheyenok, Castro Valley, CA (US); Peter Eymard Baccay, San Jose, CA (US); Carsten Michael Bergmann, San Jose, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/310,681

(22) Filed: Dec. 2, 2011

(51) Int. Cl.
*H04M 3/42* (2006.01)
(52) U.S. Cl. .... 455/416; 455/418; 455/518; 379/205.01
(58) Field of Classification Search ........... 455/416, 455/418, 518; 379/205.01
See application file for complete search history.

(56) References Cited

U.S. PATENT DOCUMENTS

| | | | |
|---|---|---|---|
| 4,635,251 A | 1/1987 | Stanley et al. | |
| 7,317,791 B2 | 1/2008 | Carlson | |
| 7,460,493 B1 | 12/2008 | Dhanoa et al. | |
| 7,703,104 B1 | 4/2010 | Webster et al. | |
| 7,894,806 B2 | 2/2011 | Leigh et al. | |
| 8,126,968 B2 * | 2/2012 | Rodman et al. | 709/205 |
| 2008/0043961 A1 | 2/2008 | Kim et al. | |
| 2008/0152114 A1 * | 6/2008 | Kim et al. | 379/205.01 |
| 2011/0184768 A1 * | 7/2011 | Norton et al. | 705/5 |
| 2011/0184943 A1 * | 7/2011 | Norton et al. | 707/723 |

* cited by examiner

*Primary Examiner* — Danh Le
(74) *Attorney, Agent, or Firm* — Finnegan, Henderson Farabow, Garrett & Dunner, LLP

(57) ABSTRACT

A method, mobile device, and conferencing system are provided for automatically establishing a conference event having a plurality of invitees. In one implementation, a method is provided for determining whether an invitee of a conference event is a moderator of the conference event. The method also automatically establishes the conference event using a moderator code responsive to determining that the invitee is the moderator of the conference event.

29 Claims, 9 Drawing Sheets

400

New Appointment

Subject: RE: Meeting with CEO

Location

402

406 — Add Conference Details

Time

☐ All Day

Start: Thu, Jun 16, 2011 11:00 AM

End: Thu, Jun 16, 2011 12:00 PM

Duration : 1 Hour 0 Mins

Time Zone: Pacific Time (-8) ▽

Reminder: None ▽

Invitees

Type Name or Email

Invited: John Doe (Organizer)

Invited: Jane Smith

404

Recurrence: None ▽
No Recurrence:

Properties

☐ Mark as Private

Show Time as: Busy ▽

Notes
Let's discuss the actions from our meeting last week.

Figure 4

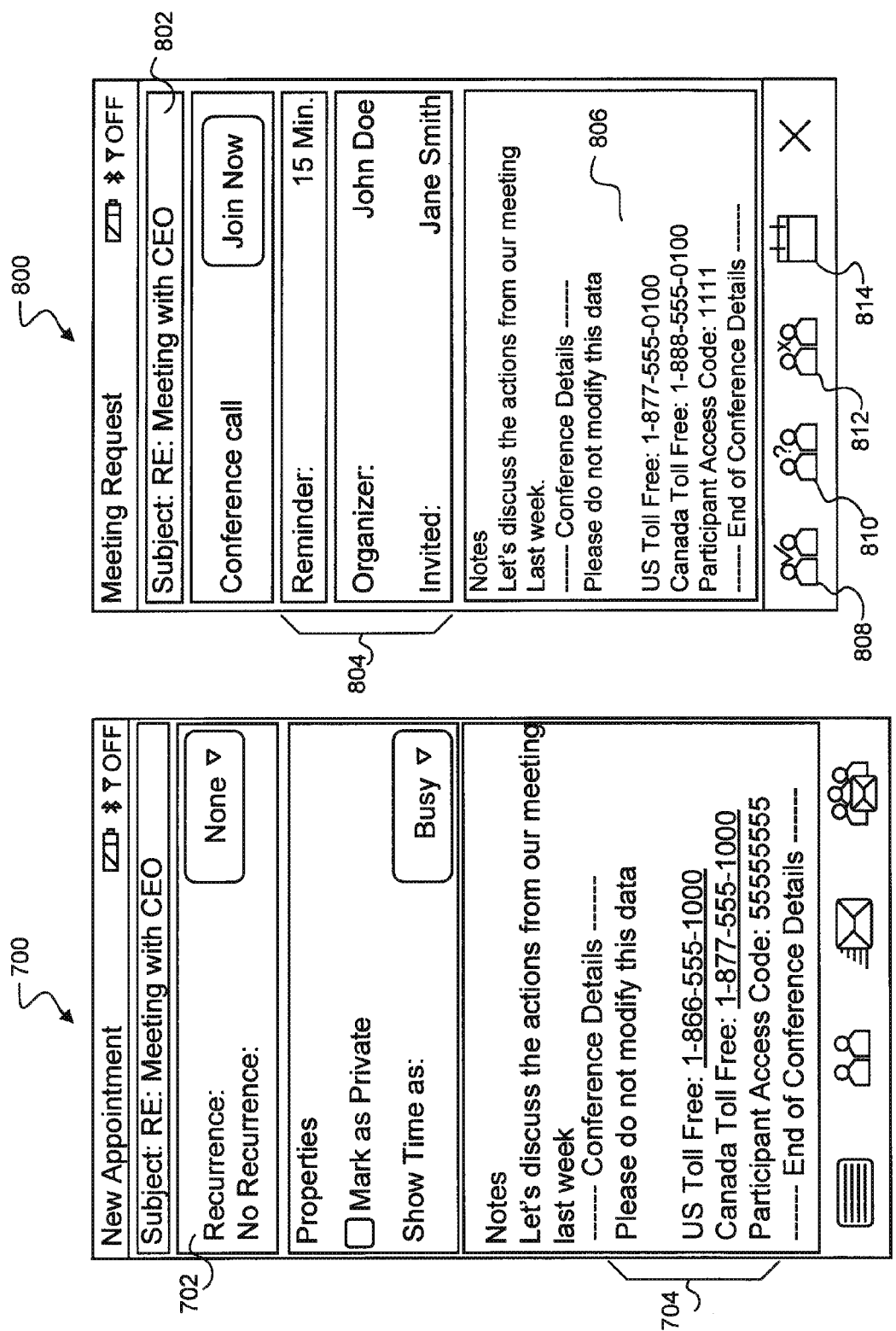

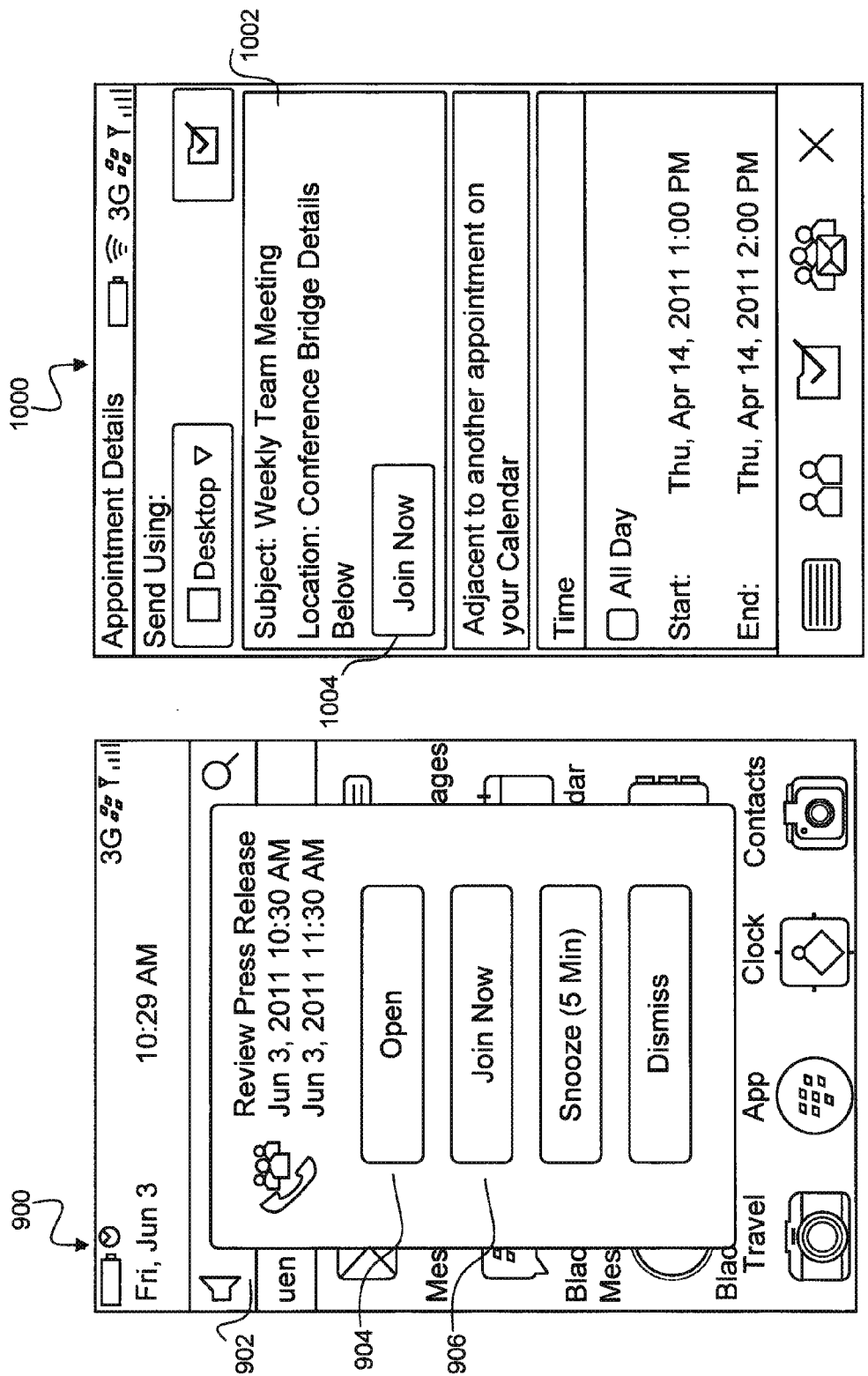

METHOD AND APPARATUS FOR MANAGING PRIVATE MODERATOR CODES FOR CONFERENCE CALLS

FIELD

Example embodiments relate to conference call systems, and more particularly to methods for managing private moderator codes for conference calls.

BACKGROUND

During a conference call, voice or media connections are typically made between two or more communication devices such as telephones or mobile phones. When scheduling a conventional conference call, a user typically is required to configure the conference call manually. For example, conference call information, including the time, attendees, organizer, conference access number, and access codes (i.e., passcodes) can be entered into specific fields or tags. Such manual entry of conference information can be performed locally on a telephone or mobile phone, or can be configured on a remote personal computer (PC).

One difficulty with existing conferencing systems is that unauthorized participants can attempt to join a conference call. The participants of a conference call are sometimes loosely defined wherein original invitees can forward invitations and access codes to others who can then participate. Moreover, if an invitation contains a moderator passcode, confusion can result due to the existence of multiple access codes in the invitation. Additionally, moderator passcodes can easily be discovered by malicious users if an organizer of the conference does not manually remove the moderator passcode from the invitation. This can lead to fraudulent uses of the moderator passcode and can compromise security of the conferencing system.

Accordingly, existing conferencing systems suffer from drawbacks that limit their efficiency and usefulness.

BRIEF DESCRIPTION OF THE DRAWINGS

Reference will now be made to the accompanying drawings showing example embodiments of this disclosure. In the drawings:

FIG. 4 illustrates an example graphical user interface displayed on a mobile communication device for scheduling of a conference event, in accordance with an example embodiment;

FIG. 7 illustrates an example graphical user interface displayed on a mobile communication device for displaying a conference invitation, in accordance with an example embodiment;

FIG. 8 illustrates another example graphical user interface displayed on a mobile communication device for displaying a conference invitation, in accordance with an example embodiment; and FIG. 9 illustrates an example graphical user interface displayed on a mobile communication device for automatically joining a conference event, in accordance with an example embodiment.

FIG. 10 illustrates another example graphical user interface displayed on a mobile communication device for automatically joining a conference event, in accordance with an example embodiment.

DESCRIPTION OF EXAMPLE EMBODIMENTS

Figure 1:
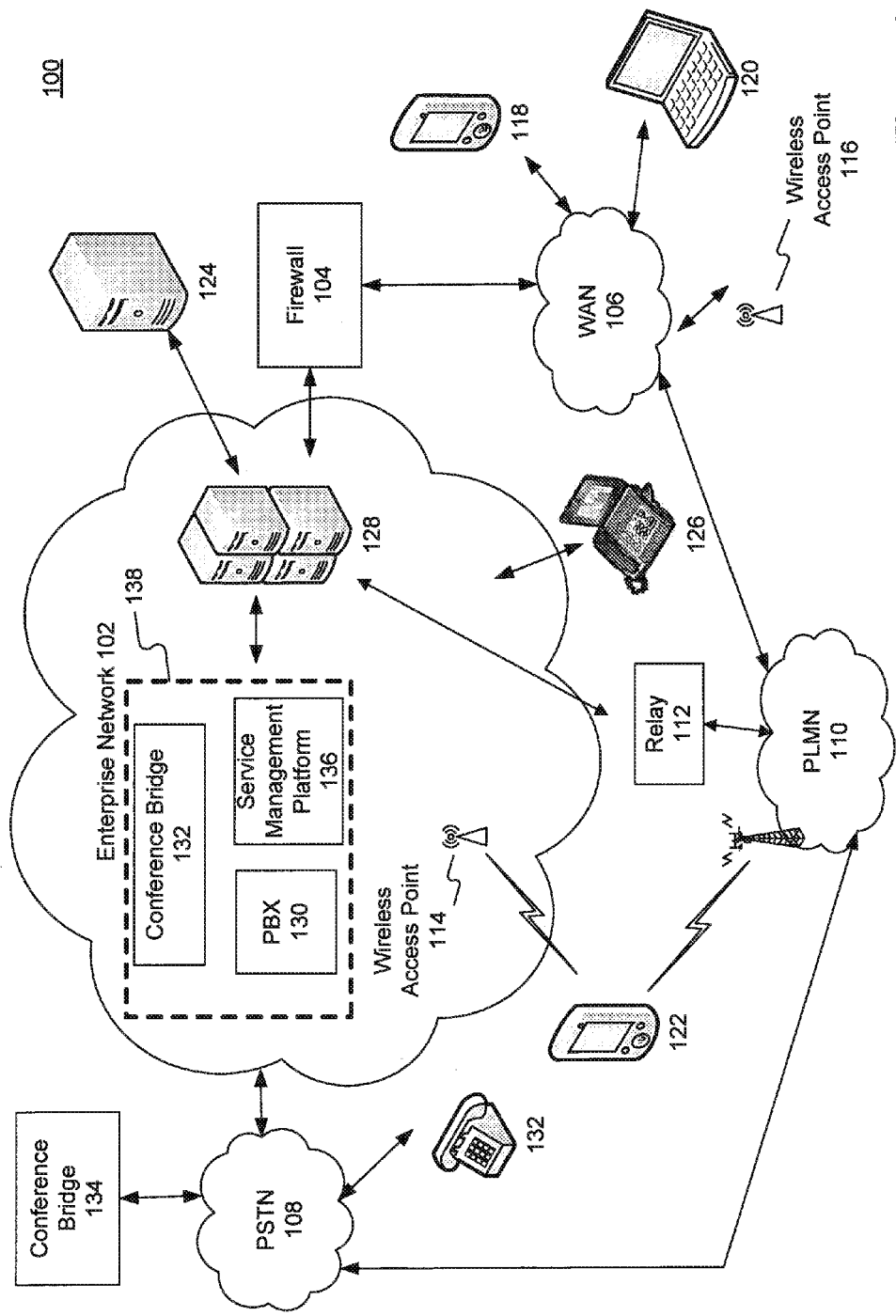
FIG. 1 shows, in block diagram form, an example system utilizing a conference call scheduling system.

In one example embodiment, a method for automatically establishing a conference event having a plurality of invitees is provided. The method includes determining whether an invitee of a conference event is a moderator of the conference event. The method also automatically establishes the conference event using a moderator code responsive to determining that the invitee is the moderator of the conference event In another example embodiment, a mobile device is provided. The mobile device includes a computer-readable storage medium storing instructions. The mobile device further includes a processor for executing the instructions to determine whether an invitee of a conference event is a moderator of the conference event, and automatically establish the conference event using a moderator code responsive to determining that the invitee is the moderator of the conference event.

In yet another example embodiment, a conferencing system is provided. The conferencing system includes a computer-readable storage medium storing instructions. The conferencing system further includes a processor for executing the instructions to determine whether an invitee of a conference event is a moderator of the conference event, and automatically establish the conference event using a moderator code responsive to determining that the invitee is the moderator of the conference event.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are example and explanatory only and are not limiting. Instead, the proper scope is defined by the appended claims.

In addition, numerous specific details are set forth in order to provide a thorough understanding of the example embodiments described herein. However, it will be understood by those of ordinary skill in the art that the example embodiments described herein can be practiced without these specific details. Furthermore, well-known methods, procedures and components have not been described in detail so as not to obscure the example embodiments described herein.

Example embodiments relate to the control and management of conference call communications, otherwise known as conference events. Although reference can be made to "calls" and "talk" in the description of example embodiments below, it will be appreciated that some of the described systems and methods can be applicable to session-based communications in general and are not limited to voice calls. Reference to calls can, for example, include shared data (e.g. presentation content) as well as media sessions which can, for example, include video and/or audio. The various communications can include both synchronous and asynchronous communications to implement such "calls."

Reference is now made to FIG. 1, which shows, in block diagram form, an example system 100 for the control and management of communications, such as conference calls or conference events. System 100 includes an enterprise network 102, which in some embodiments includes a local area network (LAN). In some embodiments, enterprise network 102 can be an enterprise or business system. In some embodiments, enterprise network 102 includes more than one network and is located in multiple geographic areas.

Enterprise network 102 is coupled, for example through a firewall 104, to a wide area network (WAN) 106, such as the Internet. Enterprise network 102 can also be coupled to a public switched telephone network (PSTN) 108 via direct inward dialing (DID) trunks or primary rate interface (PRI) trunks (not shown).

Enterprise network 102 can also communicate with a public land mobile network (PLMN) 110, which is also referred to as a wireless wide area network (WWAN) or, in some cases, a cellular network. The coupling with PLMN 110 can be via a relay 112.

In some embodiments, enterprise network 102 provides a wireless local area network (WLAN) (not shown) using wireless access points, such as wireless access point 114. In some embodiments, other WLANs can exist outside enterprise network 102. For example, a WLAN coupled to WAN 106 can be accessed via wireless access point 116. WAN 106 can be operatively coupled to one or more mobile devices or computers, such as mobile device 118, or a laptop computer 120.

System 100 can include a number of enterprise-associated mobile devices, for example, mobile devices 118 and 122. Mobile devices 118 and 122 can include devices equipped for cellular communication through PLMN 110, mobile devices equipped for Wi-Fi communications over one of the WLANs via wireless access points 114 or 116, or dual-mode devices capable of both cellular and WLAN communications. Wireless access points 114 or 116 can be configured for coupling with WLANs that operate in accordance with, for example, IEEE 802.11 specifications.

Mobile devices 118 and 122 can be, for example, cellular phones, smartphones, tablets, netbooks, and PDAs (personal digital assistants) enabled for wireless communication. Moreover, mobile devices 118 and 122 can communicate with other components using voice communications or data communications (such as accessing content from a website).

Mobile devices 118 and 122 include one or more radio transceivers and associated processing hardware and software to enable wireless communications with PLMN 110 or one of the WLANs via wireless access points 114 or 116. In various embodiments, PLMN 110 and mobile devices 118 and 122 are configured to operate in compliance with any one or more of a number of wireless protocols, including GSM, GPRS, CDMA, EDGE, UMTS, EvDO, HSPA, 3GPP, or a variety of others. It will be appreciated that mobile devices 118 and 122 can roam within PLMN 110 and across PLMNs as their user moves. In some instances, dual-mode mobile devices 118 and 122, or enterprise network 102 can be configured to facilitate roaming between PLMN 110 and wireless access points 114 or 116, and can thus be capable of seamlessly transferring sessions (such as voice calls) from a connection with the cellular interface of dual-mode devices 118 and 122 to a WLAN interface of the dual-mode device, and vice versa.

Enterprise network 102 typically includes a number of networked servers, computers, and other such devices. For example, enterprise network 102 can be coupled to a personal computer 124, such as a desktop or laptop computer, in addition to enabling the coupling with mobile device 122 via wireless access point 114. The coupling with personal computer 124 can be wired or wireless in some embodiments. Enterprise network 102 can also couple to one or more digital telephone systems or VoIP phones, such as digital phone 160.

Relay 112 can serve to route messages received over PLMN 110 from mobile device 122 to corresponding enterprise network 102, for example when mobile device 122 is outside of the range of wireless access point 114. Relay 112 can also push messages from enterprise network 102 to mobile device 112 via PLMN 110.

Enterprise network 102 can also include an enterprise server 128. Together with relay 112, or wireless access point 114, enterprise server 128 functions to redirect or relay incoming e-mail messages addressed to a user's e-mail address through enterprise network 102 to mobile devices 118 or 122 and to relay incoming e-mail messages composed and sent via mobile devices 118 or 122 out to the intended recipients within WAN 106 or elsewhere. Enterprise server 128 can provide a "push" e-mail service for mobile devices 118 or 122, enabling the user to send and receive e-mail messages using mobile devices 118 or 122 as though the user were coupled to an e-mail client within enterprise network 102 using the user's enterprise-related e-mail address, for example on computer 124.

Enterprise network 102 can include a Private Branch Exchange (in various embodiments the PBX can be a standard PBX or an IP-PBX, for simplicity the description below uses the term PBX to refer to both) 130 having a coupling with PSTN 108 for routing incoming and outgoing voice calls for the enterprise. PBX 130 can be coupled to PSTN 108 via DID trunks or PRI trunks, for example. PBX 130 can use ISDN signaling protocols for setting up and tearing down circuit-switched couplings through PSTN 108. In some embodiments, PBX 130 can be coupled to one or more conventional analog telephones 132 through PSTN 108. PBX 130 is also coupled to enterprise network 102 and, through it, to telephone terminal devices, such as digital phone 126, or softphones operating on, for example, personal computer 124. Within the enterprise, individual enterprise users can have an associated extension number, sometimes referred to as a PNP (private numbering plan), or direct dial phone number. Calls outgoing from PBX 130 to PSTN 108 or incoming from PSTN 108 to PBX 130 are typically circuit-switched calls. Within the enterprise, for example, between PBX 130 and devices within the enterprise, voice calls are often packet-switched calls, for example Voice-over-IP (VoIP) calls.

System 100 includes one or more conference bridges 132 and 134, which are facilities enabling multiple conference users to conduct discussions with one another. Conference bridge 132 can be part of the enterprise network 102. Alternatively, in some embodiments, a conference bridge 134 can be accessed via PSTN 108. Conference bridges 132 or 134 can be specified via use of a dialed number used for designating a specific conference bridge. In some embodiments, use of conference bridges 132 or 134 requires entry of an access code, such as a participant passcode or a moderator passcode. The use of such access codes provides a level of security for conference bridges 132 or 134.

Enterprise network 102 can further include a Service Management Platform (SMP) 136 for performing aspects of messaging or session control, such as call control and advanced call processing features. Collectively PBX 130, conference bridge 132, and SMP 134 are referred to as an enterprise communications platform 138. It will be appreciated that enterprise communications platform 138 and, in particular, SMP 136, can be implemented on one or more servers having suitable communications interfaces for coupling to and communicating with PBX 127, conference bridge 132, and DID/PRI trunks. Although SMP 136 can be implemented on a stand-alone server, it will be appreciated that it can be implemented into an existing control agent/server as a logical software component.

Moreover, SMP 136 can have one or more processors and at least one memory for storing program instructions. The processor(s) can be, for example, a single or multiple microprocessors, field programmable gate arrays (FPGAs), or digital signal processors (DSPs) capable of executing particular sets of instructions. Computer-readable instructions can be stored on a non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

One of the functions of enterprise communications platform 138 is to extend the features of enterprise telephony to mobile devices 118 and 122. For example, the enterprise communications platform 138 can allow mobile devices 118 and 122 to perform functions akin to those normally available on a standard office telephone, such as digital phone 126. Example features can include direct extension dialing, enterprise voice mail, conferencing, call transfer, call park, etc.

Figure 2:
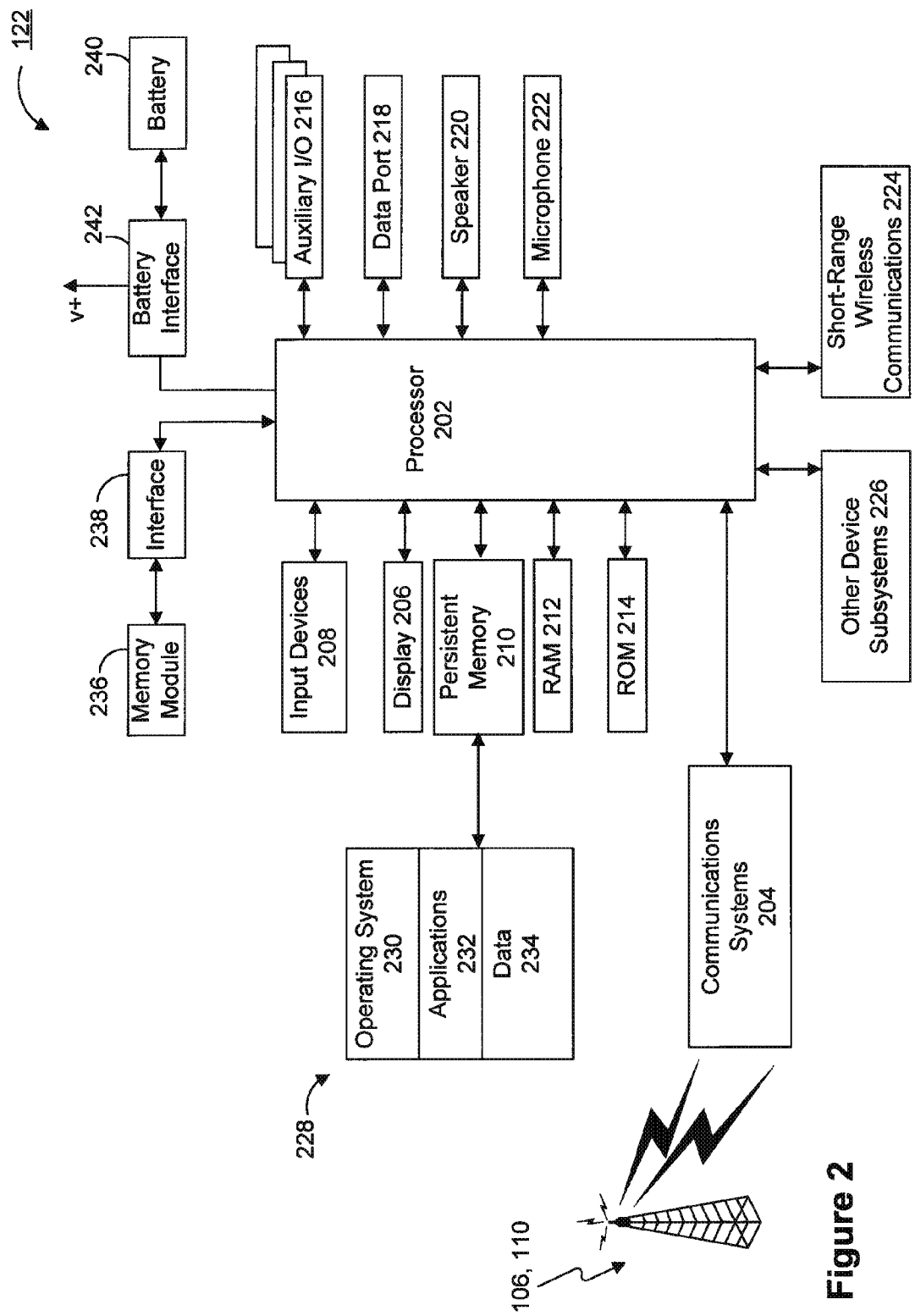
FIG. 2 is a simplified block diagram illustrating an example mobile communication device in accordance with an example embodiment.

Reference is now made to FIG. 2, which illustrates in detail example mobile device 122 in which example embodiments can be applied. Note that while FIG. 2 is described in reference to mobile device 122, it also applies to mobile device 118, and that any reference to mobile device 122 is equally applicable to mobile device 118 unless otherwise indicated.

Mobile device 122 is a two-way communication device having data and voice communication capabilities, and the capability to communicate with other computer systems, for example, via the Internet. Depending on the functionality provided by mobile device 122, in various embodiments mobile device 122 can be a handheld device, a multiple-mode communication device configured for both data and voice communication, a smartphone, a mobile telephone, a netbook, a gaming console, a tablet, or a PDA (personal digital assistant) enabled for wireless communication.

Mobile device 122 includes a rigid case (not shown) housing the components of mobile device 122. The internal components of mobile device 122 can, for example, be constructed on a printed circuit board (PCB). The description of mobile device 122 herein mentions a number of specific components and subsystems. Although these components and subsystems can be realized as discrete elements, the functions of the components and subsystems can also be realized by integrating, combining, or packaging one or more elements in any suitable fashion.

Mobile device 122 includes a controller comprising at least one processor 202 (such as a microprocessor), which controls the overall operation of mobile device 122. Processor 202 can be a single microprocessor, multiple microprocessors, field programmable gate arrays (FPGAs), or digital signal processors (DSPs) capable of executing particular sets of instructions. Processor 202 interacts with device subsystems such as a communication system 204 for exchanging radio frequency signals with the wireless network (for example WAN 106 and/or PLMN 110) to perform communication functions.

Processor 202 also interacts with additional device subsystems including a display 206 such as a liquid crystal display (LCD) screen or any other appropriate display, input devices 208 such as a keyboard and control buttons, persistent memory 210, random access memory (RAM) 212, read only memory (ROM) 214, auxiliary input/output (I/O) subsystems 216, data port 218 such as a conventional serial data port or a Universal Serial Bus (USB) data port, speaker 220, microphone 222, short-range wireless communications subsystem 224 (which can employ any appropriate wireless (for example, RF), optical, or other short range communications technology), and other device subsystems generally designated as 226. Some of the subsystems shown in FIG. 2 perform communication-related functions, whereas other subsystems can provide "resident" or on-device functions.

Display 206 can be realized as a touch-screen display in some embodiments. The touch-screen display can be constructed using a touch-sensitive input surface coupled to an electronic controller and which overlays the visible element of display 206. The touch-sensitive overlay and the electronic controller provide a touch-sensitive input device and processor 202 interacts with the touch-sensitive overlay via the electronic controller.

Communication system 204 includes one or more communication systems for communicating with wireless WAN 106 and wireless access points 114 and 116 within the wireless network. The particular design of communication system 204 depends on the wireless network in which mobile device 122 is intended to operate. Mobile device 122 can send and receive communication signals over the wireless network after the required network registration or activation procedures have been completed.

Processor 202 operates under stored program control and executes software modules 228 stored in a tangible non-transitory computer-readable storage medium such as persistent memory 210, which can be a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Software modules 228 can also be stored in a computer-readable storage medium such as ROM 214, or any appropriate persistent memory technology, including EEPROM, EAROM, FLASH. These computer-readable storage mediums store computer-readable instructions for execution by processor 202 to perform a variety of functions on mobile device 122.

Software modules 228 can include operating system software 230, used to control operation of mobile device 122. Additionally, software modules 228 can include software applications 232 for providing additional functionality to mobile device 122. For example, mobile device 122 can include a calendar application for allowing a user to schedule appointments, such as conference call appointments, and a conference call application designed to assist a user with joining of conference calls.

Software applications 232 can further include a range of applications, including, for example, e-mail messaging application, address book, notepad application, Internet browser application, voice communication (i.e., telephony) application, mapping application, or a media player application, or any combination thereof. Each of software applications 232 can include layout information defining the placement of particular fields and graphic elements (for example, text fields, input fields, icons, etc.) in the user interface (i.e., display 206) according to the application.

In some embodiments, persistent memory 210 stores data 234, including data specific to a user of mobile device 122, such as audio conference profiles for indicating one or more conference dial-in telephone numbers, access codes, and other similar information. Persistent memory 210 can additionally store identification data, such as identifiers related to particular conferences. Persistent memory 210 can also store data relating to various people, for example, a name of a user, a user's identifier (user name, email address, or any other identifier), place of employment, work phone number, home address, or other types of user-specific information. Persistent memory 210 can further store data relating applications with the particular user of, for example, mobile device 122. In certain embodiments, persistent memory 210 can store data 234 linking a user's data with the calendar application and the conference call application, enabling the applications to identify a particular user who is the primary operator of the mobile device. Furthermore, in various embodiments, data 234 also includes service data comprising information required by mobile device 122 to establish and maintain communication with the wireless network (for example WAN 106 and/or PLMN 110). Data 234 can also include, for example, scheduling and configuration information for establishing a scheduled conference call, such as a conference call dial-in number, a moderator passcode, or a participant passcode.

In some embodiments, auxiliary input/output (I/O) subsystems 216 comprise an external communication link or interface, for example, an Ethernet connection. In some embodiments, auxiliary I/O subsystems 216 can further comprise one or more input devices, including a pointing or navigational tool such as a clickable trackball or scroll wheel or thumbwheel, or one or more output devices, including a mechanical transducer such as a vibrator for providing vibratory notifications in response to various events on mobile device 122 (for example, receipt of an electronic message or incoming phone call), or for other purposes such as haptic feedback (touch feedback).

In some embodiments, mobile device 122 also includes one or more removable memory modules 236 (typically comprising FLASH memory) and a memory module interface 238. Among possible functions of removable memory module 236 is to store information used to identify or authenticate a user or the user's account to a wireless network (for example WAN 106 or PLMN 110). For example, in conjunction with certain types of wireless networks, including GSM and successor networks, removable memory module 236 is referred to as a Subscriber Identity Module (SIM). Memory module 236 is inserted in or coupled to memory module interface 238 of mobile device 122 in order to operate in conjunction with the wireless network.

Mobile device 122 also includes a battery 240 which furnishes energy for operating mobile device 122. Battery 240 can be coupled to the electrical circuitry of mobile device 122 through a battery interface 242, which can manage such functions as charging battery 240 from an external power source (not shown) and the distribution of energy to various loads within or coupled to mobile device 122. Short-range wireless communications subsystem 224 is an additional optional component that provides for communication between mobile device 122 and different systems or devices, which need not necessarily be similar devices. For example, short-range wireless communications subsystem 224 can include an infrared device and associated circuits and components, or a wireless bus protocol compliant communication device such as a BLUETOOTH® communication module to provide for communication with similarly-enabled systems and devices.

A predetermined set of applications that control basic device operations, including data and possibly voice communication applications can be installed on mobile device 122 during or after manufacture. Additional applications or upgrades to operating system software 230 or software applications 232 can also be loaded onto mobile device 122 through the wireless network (for example WAN 106 and/or PLMN 110), auxiliary I/O subsystem 216, data port 218, short-range wireless communication subsystem 224, or other suitable subsystem such as 226. The downloaded programs or code modules can be permanently installed, for example, written into the persistent memory 210, or written into and executed from RAM 212 for execution by processor 202 at runtime.

Mobile device 122 can provide three principal modes of communication: a data communication mode, a voice communication mode, and a video communication mode. In the data communication mode, a received data signal such as a text message, an e-mail message, Web page download, or an image file are processed by communication system 204 and input to processor 202 for further processing. For example, a downloaded Web page can be further processed by a browser application, or an e-mail message can be processed by an e-mail message messaging application and output to display 206. A user of mobile device 122 can also compose data items, such as e-mail messages, for example, using the input devices, such as auxiliary I/O subsystem 216, in conjunction with display 206. These composed items can be transmitted through communication system 204 over the wireless network (for example WAN 106 or PLMN 110). In the voice communication mode, mobile device 122 provides telephony functions and operates as a typical cellular phone. In the video communication mode, mobile device 122 provides video telephony functions and operates as a video teleconference terminal. In the video communication mode, mobile device 122 utilizes one or more cameras (not shown) to capture video of video teleconference.

As indicated above, persistent memory 210 can store data specific to a user of mobile device 122, such as audio conference profiles for indicating one or more conference dial-in telephone numbers, access codes, and other similar information. After scheduling of a conference call, a user can designate an appropriate audio conference profile to be used by a conference call application executing on mobile device 122. The conference profiles feature can provide the option to save conference information into profiles. When creating meetings using the conference call application, an organizer can readily populate the conference information by selecting a profile for that meeting, and automatically issue a conference invitation to invitees. Moreover, when populating the conference information from the profile, certain information can be excluded from the invitation. In certain embodiments, moderator information, such as a moderator passcode, can be excluded from the information extracted from the selected profile, thereby preventing transmission of the moderator information to the invitees.

As used herein, a reference to "organizer" refers to a user who created or issued the conference invitation, or who is designated as an organizer in data contained in the conference invitation. Furthermore, as used herein, a reference to "moderator" (sometimes referred to as a "host") refers to a user who, for example, presides over the conference call, and can perform administrative procedures with respect to the conference call. Moreover, while an organizer may also be a moderator, it is to be appreciated that a moderator is not necessarily an organizer.

Figure 3:
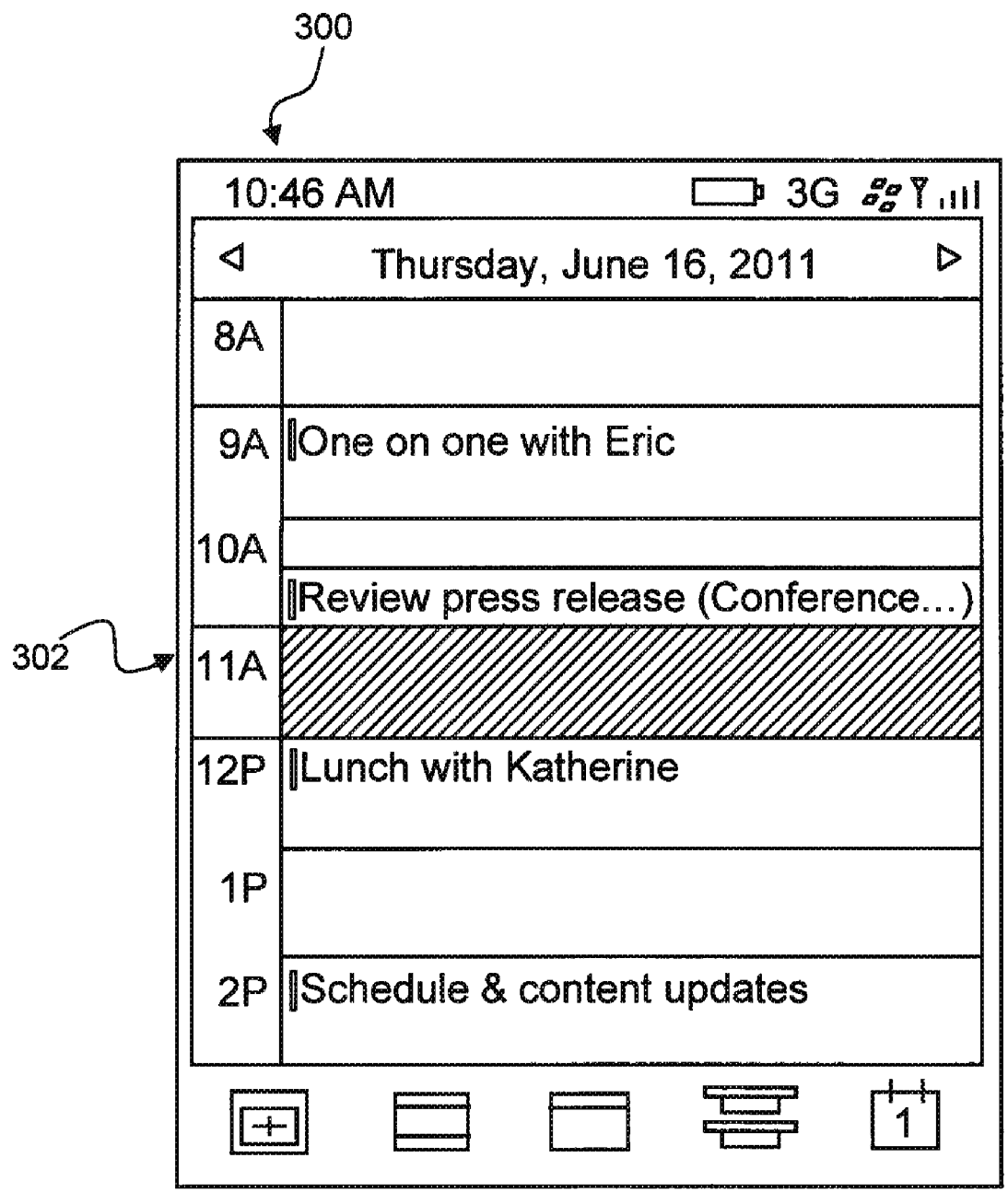
FIG. 3 illustrates an example graphical user interface displayed on a mobile communication device for scheduling of a calendar meeting, in accordance with an example embodiment.

FIG. 3 shows an example calendar application user interface 300 for allowing a user to view calendar entries organized by date and time. Interface 300 can be accessed from the desktop of a mobile device (for example, mobile device 122), for example in response to a command from auxiliary I/O subsystem 216. In some embodiments, interface 300 can be accessed via physical key or button on the mobile device.

Interface 300 provides a visual representation to a user of mobile device 122 of any upcoming appointments or other such events associated with a user of mobile device 122. Furthermore, interface 300 allows a user to schedule appointments, such as conference calls. For example, a user of interface 300 can determine that a conference call is required at 11:00 a.m., and can highlight, for example via a touch input or other such input from auxiliary I/O subsystem 216, an entry 302 of the calendar application corresponding to 11:00 a.m. By selecting entry 302, the calendar application can access a conference call scheduling system or application to schedule a new conference appointment.

FIG. 4 shows an example of a New Appointment user interface 400 used for creating a conference invitation. Using interface 400, an organizer of a conference call can input conference information in an appointment 402, such as a subject for the conference, notes, a listing of invitees, time and duration information, and various other properties associated with the conference call appointment. The appointment area can designate the user creating the new conference as the organizer 404 of the conference, and this designation can be saved as a "Organizer" flag with the conference invitation, either as a visible flag represented as, for example, a checkbox associated with the organizer, or as a hidden field accessible via the conference call application. Furthermore, certain fields of the conference invitation can be automatically populated using audio conference profiles, such as profiles stored in persistent memory 210. In some embodiments, an organizer of the conference call can select option 406 to add conference details through the selection of an appropriate audio conference profile.

Figure 5:
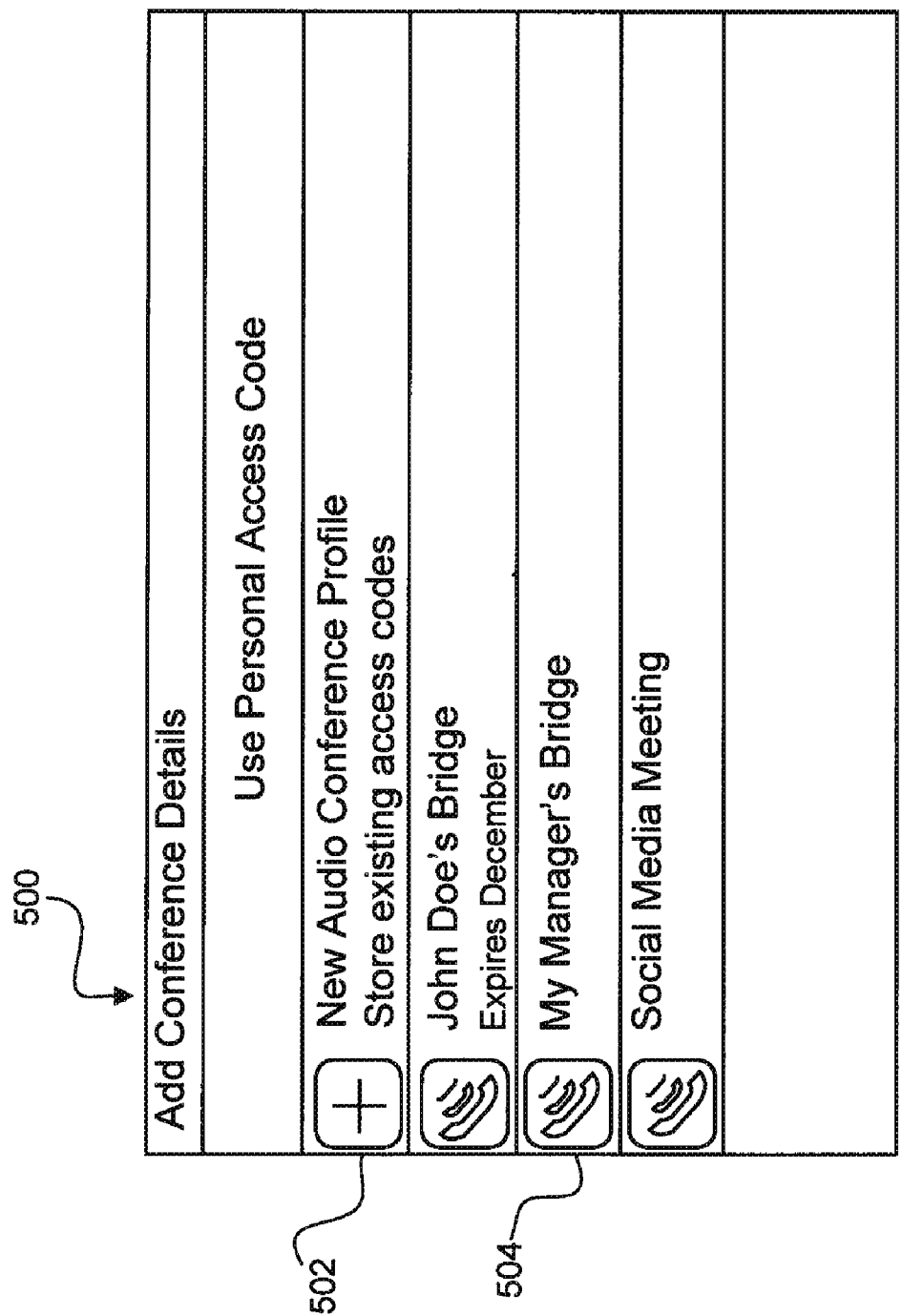
FIG. 5 illustrates an example graphical user interface displayed on a mobile communication device for selecting an audio conference profile, in accordance with an example embodiment.

FIG. 5 shows an example of an Add Conference Details user interface 500 for allowing a user to select an appropriate audio conference profile for associating with a conference call. In some embodiments, interface 500 can be displayed after selection of option 406, and can generally be used for creating and selecting audio conference profiles. For example, after display of interface 500, a listing of existing audio conference profiles, such as those stored in persistent memory 210, can be displayed. Furthermore, an option 502 provides the ability to create a new audio conference profile by selecting New Audio Conference Profile option 502. Accordingly, in some embodiments, by selecting option 502, a new audio conference profile can be created and stored in memory.

Figure 6:
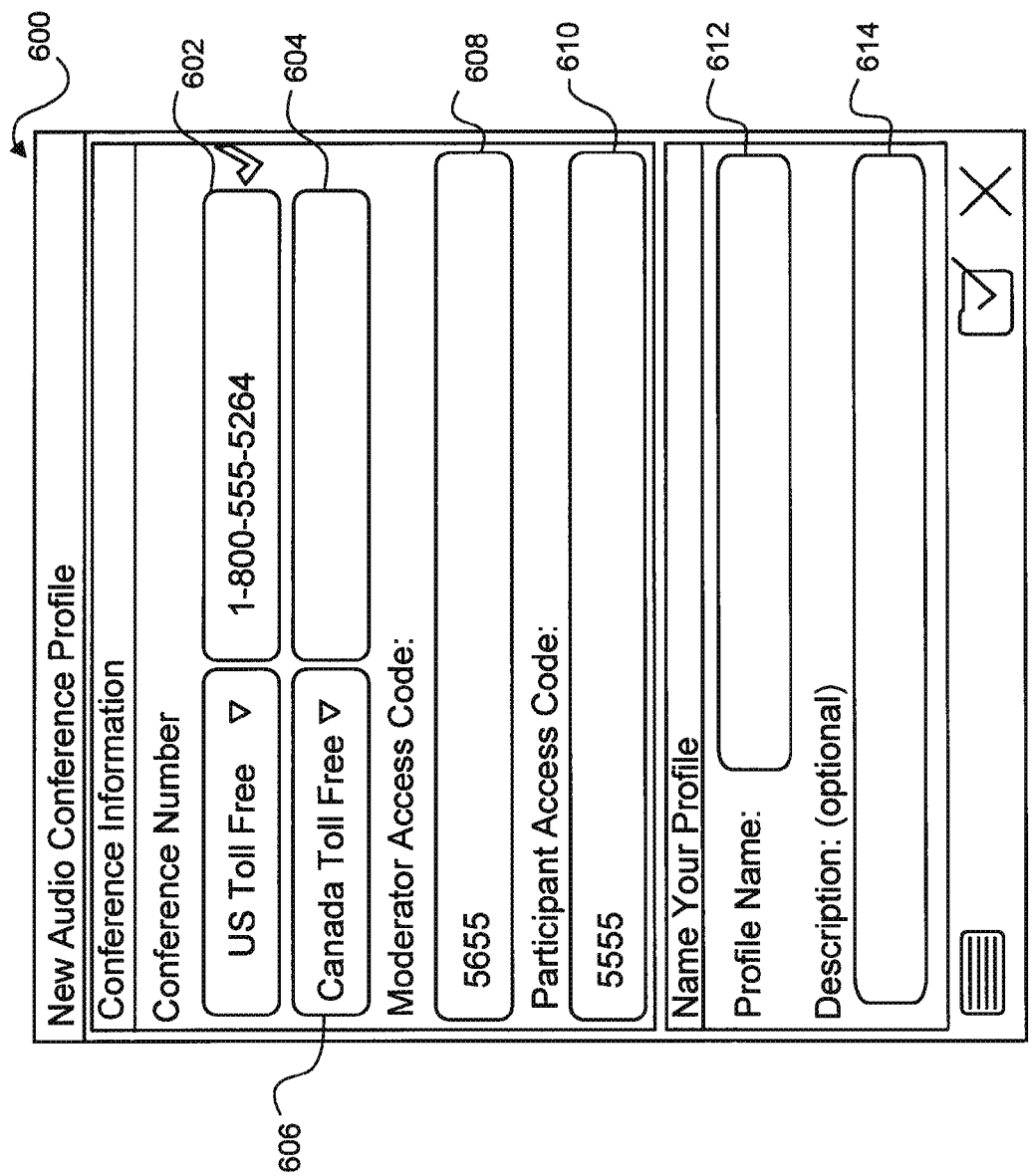
FIG. 6 illustrates an example graphical user interface displayed on a mobile communication device for creating a new audio conference profile, in accordance with an example embodiment.

FIG. 6 shows an example of a New Audio Conference Profile user interface 600, in accordance with some example embodiments, which can be displayed as a result of selection of option 502. Interface 600 provides a number of input fields that can be used for setting of default conference call information to be saved and stored in an audio conference profile. For example, fields of interface 600 can include Conference Number fields 602 and 604, a Moderator Access Code field 608, a Participant Access Code field 610, a Profile Name field 612, and a Description field 614. These fields can be edited by a user through interface 600. It is to be appreciated that Conference Number fields 602 and 604 are not limited to entry of telephone numbers, but can also receive addresses, such as an IP address, for designating a conferencing organizer system, such as enterprise communications platform 138. Furthermore, it can be appreciated that, in some example embodiments, the moderator access code need not be limited to a numeric passcode, but can be a computer-based password or key.

Moreover, some example embodiments can support multiple addresses, such as multiple phone numbers or address links. For example, an audio conference profile can include a plurality of numbers or addresses to be used to contact enterprise communications platform 138. In some example embodiments, once a first Conference Number field 602 is populated, another Conference Number field 604 can be displayed for editing. A particular label associated with Conference Number field 604 can be changed to provide an appropriate label for the associated number or address. For example, the label of "Canada Toll Free" or "International" can be displayed by selecting a dropdown menu 606. Note that, in some example embodiments, the audio conference profile can also support more than one moderator access code or participant access code (not shown).

Referring again to FIG. 5, a user can alternatively select an existing audio conference profile, such as profile 504, to be used for a conference call appointment. By selecting profile 504, information associated with profile 504, such as conference bridge information (e.g., a telephone number and an associated participant passcode) can be automatically populated into a conference invitation. Furthermore, while certain audio conference profiles, such as profile 504, can have moderator passcodes or other such sensitive information included in the profile, the automatic population of the profile information excludes information designated as sensitive from being included in the data populated into the conference invitation. For example, after selection of profile 504, the conference bridge information automatically populates into a conference invitation including only a conference number and a participant passcode, as any moderator passcodes stored in profile 504 can be excluded.

FIG. 7 shows a New Appointment user interface 700 displayed as a result of selecting profile 504 on a conference organizer's device, such as mobile device 122. Interface 700 includes a conference call invitation 702, which includes the various conference information entered into appointment 402. Conference call invitation 702 also includes a conference bridge 704 (i.e., particulars for establishing a conference call) that was automatically populated into the invitation as a result of selecting profile 504. Conference bridge 704 includes only a subset of information from selected profile 504 that is not considered sensitive information. For example, conference details 704 includes the conference numbers and a participant passcode, allowing invitees to connect to the conference call, but does not include a moderator passcode or other such sensitive information present in profile 504. After approving the conference call invitation 702, the organizer can transmit conference call invitation 702 to the invitees. Moreover, after transmission of conference call invitation 702 to the invitees, details of the invitation are stored as a calendar event record in a calendar application of the organizer's device.

FIG. 8 shows a Meeting Request user interface 800 for displaying a received invitation 802 for a conference call meeting on an invitee's device, such as mobile device 118. Mobile device 118 first receives invitation 802 from another communication device, such as organizer's mobile device 122, with respect to a scheduled conference call. As shown, invitation 802 as displayed can include a number of fields 804 that relate to conference call scheduling information. Fields 804 can include, for example, the Subject, Start time, End time, Recurrence, Organizer, Invitees, and Notes. The Notes conference information provides connection addresses for operatively connecting to enterprise communications platform 138, such as conference bridge 806, including web information or audio (dialing) information and a participant access code for accessing the conference call. The moderator access code is not present as it was not included in the invitation issued by organizer's mobile device 122. In some example embodiments, example interface 800 can be displayed using a calendar application or a conference calling add-on, plug-in or other such application, as a stand-alone or in combination with other applications.

In some example embodiments, invitation 802 can be received as an e-mail message designating an invitee's e-mail address, but can also be in other forms such as short message service (SMS), SIP message, instant messaging, or calendar invite. Furthermore, invitation 802 can be received directly or indirectly from organizer's mobile device 122.

As shown on the interface 800, a number of response options can be selected in order to respond to the invitation message 802. As shown, the response options include an Accept option 808, a Tentative option 810, and a Decline option 812. After selection of one or more of the response options, a communication containing the response is sent to organizer's mobile device 122. In further example embodiments, selection of Accept option 808 can result in the details of invitation 802 being stored as a calendar event record in a calendar application of the invitee's device. Interface 800 can also include a calendar option 814, allowing a user to access a calendar to confirm availability for the conference.

FIG. 9 shows a user interface 900 displaying a popup reminder interface 902 displayed at a time of a conference call session, or a specified time beforehand, as a result of the creation of a calendar event record. In some embodiments, a calendar application or conference call application can determine the presence of a conference event based on the created calendar event record, and display popup reminder interface 902 after determination of the presence of the conference event. From popup reminder interface 902, a user can open the conference event using an "Open" button 904 to display details of the conference event. In some example embodiments, the conference call application can include a join now feature, shown as a "Join Now" button 906, for automatically establishing the scheduled conference call session. Once the time of that meeting arrives, or a predetermined time beforehand, a popup reminder interface 902 including the "Join Now" button 906 can be displayed on the mobile device, such as mobile device 118 or 122.

FIG. 10 shows an Appointment Details user interface 1000 displayed as a result of selecting "Open" button 904 on popup reminder interface 902. Interface 1000 includes conference details 1002 for the conference event, allowing a user to review details regarding the upcoming conference. Furthermore, conference details 1002 can also include a "Join Now" button 1004 for automatically establishing the scheduled conference call, directly from interface 1000.

After selection of, for example, "Join Now" buttons 906 or 1004, the conference call application performs a method for automatically establishing the scheduled conference call session. As part of the process, the conference call application performs a determination as to whether an invitee of the conference call, such as a user associated with a calendar application or a conference call application of the mobile device, is a moderator of the conference call. More particularly, the conference call applications determines whether the invitee is designated as an organizer for the conference call, and should therefore use a moderator passcode for establishing the conference call. Because the moderator passcode is excluded from the conference invitation, each invitee (including the organizer) who received the issued invitation possesses a calendar event record that includes common conference bridge information. Accordingly, to properly establish the conference call, the conference call application must determine the appropriate moderator for the conference call. Based on the determination of the appropriate moderator for the conference call, the conference call application can establish the conference call using either the common conference bridge information contained in the issued invitation, or a moderator passcode contained in an audio conference profile.

Figure 11:
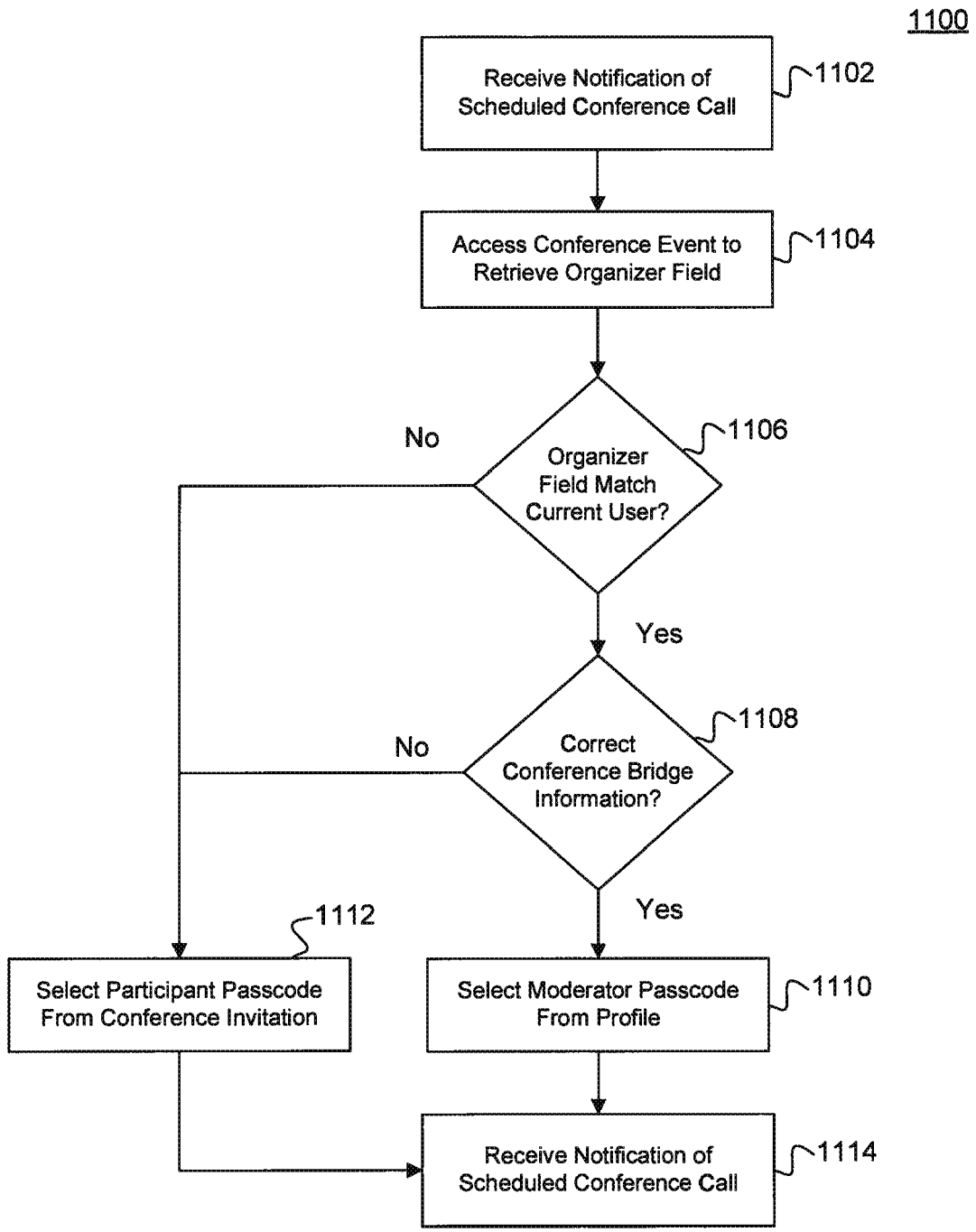
FIG. 11 is a flow diagram of an example method for automatically establishing a conference event.

FIG. 11 is a flowchart representing an example method for automatically establishing a conference event. Using method 1100, a user of a mobile device can easily connect to a conference call with a simple selection of a join button, and the conference call application will automatically determine whether the conference call should be established using a moderator passcode or a participant passcode. It is to be appreciated that method 1100 is not limited to being performed on a mobile device, and can instead be performed by a conferencing system located, for example, within enterprise network 102.

Method 1100 begins at step 1102, where a mobile device receives a notification from a calendar application regarding the existence of a scheduled conference event, such as a conference call, as a result of the presence of a calendar event record corresponding to the conference call. After receiving an indication to automatically establish the conference call, for example by clicking a join button in a conference call application, the conference call application determines the appropriate conference bridge information to use. Specifically, the conference call application determines whether an invitee is a moderator for the conference call.

To determine whether the invitee is a moderator, at step 1104, the calendar event record corresponding to the conference call, i.e., the conference event, is accessed by the conference call application to retrieve details of the conference call. Specifically, the conference call application accesses the "Organizer" flag stored in the conference invitation, which as noted above can be stored as a visible checkbox, or as a hidden field in the conference invitation, and retrieves data representing the organizer of the conference invitation. In some embodiments, the conference call application can determine whether an invitee is an organizer based on whether or not the mobile device has stored the moderator passcode of the conference event.

At step 1106, the conference call application performs a determination as to whether the retrieved organizer data from the conference invitation matches data on the mobile device identifying a particular invitee, such as a current user associated with the mobile device. For example, the user can be associated with either the calendar application or the conference call application of the mobile device. Furthermore, the conference call application can access configuration data of the calendar application or the conference call application to determine a user associated with the applications for comparison with the retrieve organizer data from the conference invitation. After determining that the user identified in the organizer field matches with the user associated with the mobile device, method 1100 proceeds to step 1108.

At step 1108, the conference call application can make a determination whether the common conference bridge information in the conference invitation is also contained in an audio conference profile associated with the user. This confirmation can assist the conference call application in determining that the user associated with the mobile device will be designated as a moderator on the correct conference call, thereby preventing the improper granting of moderator access on an incorrect conference call. Furthermore, by determining a corresponding audio conference profile, the moderator passcode can be selected for establishing the conference call. For example, the conference call application checks the conference number and participant passcode found within the conference invitation, and then proceeds to scan through the audio conference profiles associated with the user identified in step 1106 to find information matching the conference number and participant passcode. After finding a matching audio conference profile including the common conference bridge from the conference invitation, the conference call application can determine the appropriate moderator passcode, included in the matching audio conference profile, to be used for establishing the conference call. In some embodiments, step 1108 may simply be a matching step for locating the moderator passcode corresponding to the common conference bridge, and any determination steps can be omitted.

At step 1110, based on the match between the common conference bridge information and an audio conference profile, the conference call application can access the matching audio conference profile located at step 1108, and can select the moderator passcode associated with the matching audio conference profile. The conference call application can use the selected moderator passcode for use in automatically establishing the conference call, in place of the participant passcode originally included with the conference invitation.

Alternatively, if at step 1106 the conference call application determines that a user associated with the calendar application or the conference call application does not match the invitee identified in the organizer field of the conference invitation, method 1100 proceeds to step 1112. Additionally, if at step 1108 the conference call application determines that the conference bridge information in the conference invitation does not match any conference bridge information contained in an audio conference profile of the user, method 1100 proceeds to step 1112, so as to prevent the improper granting of moderator access to an incorrect conference call.

At step 1112, the conference call application selects the participant passcode included in the conference invitation to be used for establishing the conference call.

Finally, at step 1114, the conference call application automatically establishes the conference call using the conference number provided in the conference invitation, and when prompted for entry of an access code, uses either the selected moderator passcode or the selected participant passcode to gain entry to the conference call, depending on the results of steps 1106 and 1108.

Further expanding on method 1100, it is to be understood that the process of scheduling a conference call is not limited to scheduling on a mobile device, such as mobile device 122. Rather, a conference call invitation can be created on any computing device having access to enterprise communications platform 138 and capable of issuing invitations, such as personal computer 124. For example, a conference organizer can manually create a conference call invitation, either through a software application such as a calendar application or an email application, and a moderator passcode can be excluded from the manually created invitation to protect such sensitive information. Using method 1100 of FIG. 11, the organizer's mobile device can automatically establish a conference call using the moderator passcode stored in the organizer's audio conference profile, even though the conference call invitation originated from a device other than the organizer's mobile device, such as personal computer 124. Thus, method 1100 allows an organizer to automatically establish a conferencing event using the organizer's moderator passcode, without requiring the organizer to disclose the moderator passcode to invitees or other third parties.

Moreover, in certain embodiments, a conference call application can provide the ability for an organizer to delegate moderator duties to another invitee. For example, in certain embodiments, when an invitee accepts a conference invitation issued by an organizer, the invitee's conference call application can locally store a temporary copy of an audio conference profile containing conference bridge information included in the conference invitation, which can then be deleted following the scheduled timing of the conference call. Accordingly, if it is determined that the organizer will be unavailable for the conference call, the organizer can modify the originally issued conference invitation to designate an invitee as the new moderator for the conference call.

For example, the organizer can designate the new moderator by entering a user name, an email address, or other such information identifying the new moderator. Accordingly, in certain embodiments, a notification message can be issued to the new moderator reflecting this change. Alternatively, in certain embodiments, an updated conference invitation can be issued, and the updated conference invitation can contain an updated "Organizer" flag designating the new moderator as the organizer of the conference call. Moreover, after transmitting of the updated invitation, the conference call application can, in some embodiments, extract and transmit the moderator passcode from the organizer's audio conference profile directly to the new moderator for saving to an audio conference profile associated with the common conference bridge information included in the original conference invitation. As a result, an organizer can delegate moderator duties to another invitee simply by designating the invitee as a new moderator, and can avoid sending the moderator passcode to all invitees in the group which can compromise security.

While the above description provides examples of one or more processes or apparatuses, it will be appreciated that other processes or apparatuses can be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A method for automatically establishing a conference event having a plurality of invitees, comprising:
   determining whether an invitee of a conference event is a moderator of the conference event, the invitee being associated with one or more conference profiles storing conference bridge data;
   determining whether a conference bridge designated for the conference event matches conference bridge data stored in the invitee's conference profile;
   selecting the moderator code from the invitee's conference profile for use in automatically establishing the conference event; and
   automatically establishing the conference event using the moderator code responsive to determining that the invitee is the moderator of the conference event.

2. The method of claim 1, wherein an organizer of the conference event is indicated by a flag in the conference event designating a particular invitee of the conference event as the organizer.

3. The method of claim 2, comprising:
   comparing an identifier associated with the invitee to the particular invitee designated by the flag, and
   designating the invitee as the moderator based on the identifier matching the particular invitee designated by the flag.

4. The method of claim 1, wherein the conference bridge designated for the conference event includes a conference number and a participant code, and does not include the moderator code.

5. The method of claim 1, wherein an alternate invitee is designated as a moderator by issuing a new conference event designating the alternate invitee as the moderator.

6. A mobile device for automatically establishing a conference event having a plurality of invitees, comprising:
   a computer-readable storage medium storing instructions; and
   a processor executing the instructions to:
      determine whether an invitee of a conference event is a moderator of the conference event, the invitee being associated with one or more conference profiles storing conference bridge data;
      determine whether a conference bridge designated for the conference event matches conference bridge data stored in the invitee's conference profile;
      select the moderator code from the invitee's conference profile for use in automatically establishing the conference event; and
      automatically establish the conference event using the moderator code responsive to determining that the invitee is the moderator of the conference event.

7. The mobile device of claim 6, wherein an organizer of the conference event is indicated by a flag in the conference event designating a particular invitee of the conference event as the organizer.

8. The mobile device of claim 7, comprising executing instructions by the processor to:
   compare an identifier associated with the invitee to the particular invitee designated by the flag, and
   designate the invitee as the moderator based on the identifier matching the particular invitee designated by the flag.

9. The mobile device of claim 6, wherein the conference bridge designated for the conference event includes a conference number and a participant code, and does not include the moderator code.

10. The mobile device of claim 6, wherein an alternate invitee is designated as the moderator by issuing a new conference event designating the alternate invitee as the moderator.

11. A conferencing system for automatically establishing a conference event having a plurality of invitees, comprising:
    a computer-readable storage medium storing instructions; and
    a processor executing the instructions to:
       determine whether an invitee of a conference event is a moderator of the conference event;
       determine whether a conference bridge designated for the conference event matches conference bridge data stored in one or more conference profiles associated with the invitee, the conference profiles storing conference bridge data;
       select the moderator pass from the invitee's conference profile for use in automatically establishing the conference event; and
       automatically establish the conference event using the moderator code responsive to determining that the invitee is the moderator of the conference event.

12. The conferencing system of claim 11, wherein an organizer of the conference event is indicated by a flag in the conference event designating a particular invitee of the conference event as the organizer.

13. The conferencing system of claim 12, comprising executing instructions by the processor to:
    compare an identifier associated with the invitee to the particular invitee designated by the flag, and
    designate the invitee as the moderator based on the identifier matching the particular invitee designated by the flag.

14. The conferencing system of claim 11, wherein the conference bridge designated for the conference event includes a conference number and a participant code, but does not include the moderator code.

15. The conferencing system of claim 11, wherein an alternate invitee is designated as a moderator by issuing a new conference event designating the alternate invitee as the moderator.

16. A method for automatically establishing a conference event having a plurality of invitees, comprising:
    determining whether an invitee of a conference event is a moderator of the conference event by:
       comparing an identifier associated with the invitee to a particular invitee designated by a flag in the conference event, the flag designating a particular invitee of the conference event as the organizer; and
       designating the invitee as the moderator based on the identifier matching the particular invitee designated by the flag; and
    automatically establishing the conference event using a moderator code responsive to determining that the invitee is the moderator of the conference event.

17. The method of claim 16, wherein the invitee is associated with one or more conference profiles storing conference bridge data.

18. The method of claim 17, comprising:
- determining whether a conference bridge designated for the conference event matches conference bridge data stored in the invitee's conference profile; and
- selecting the moderator code from the invitee's conference profile for use in automatically establishing the conference event.

19. The method of claim 18, wherein the conference bridge designated for the conference event includes a conference number and a participant code, and does not include the moderator code.

20. The method of claim 16, wherein an alternate invitee is designated as a moderator by issuing a new conference event designating the alternate invitee as the moderator.

21. A mobile device for automatically establishing a conference event having a plurality of invitees, comprising:
- a computer-readable storage medium storing instructions; and
- a processor executing the instructions to:
  - determine whether an invitee of a conference event is a moderator of the conference event by executing instructions to:
    - compare an identifier associated with the invitee to a particular invitee designated by a flag in the conference event, the flag designating a particular invitee of the conference event as the organizer; and
    - designate the invitee as the moderator based on the identifier matching the particular invitee designated by the flag; and
  - automatically establish the conference event using a moderator code responsive to determining that the invitee is the moderator of the conference event.

22. The mobile device of claim 21, wherein the invitee is associated with one or more conference profiles storing conference bridge data.

23. The mobile device of claim 22, comprising executing instructions by the processor to:
- determine whether a conference bridge designated for the conference event matches conference bridge data stored in the invitee's conference profile; and
- select the moderator code from the invitee's conference profile for use in automatically establishing the conference event.

24. The mobile device of claim 23, wherein the conference bridge designated for the conference event includes a conference number and a participant code, and does not include the moderator code.

25. The mobile device of claim 21, wherein an alternate invitee is designated as the moderator by issuing a new conference event designating the alternate invitee as the moderator.

26. A conferencing system for automatically establishing a conference event having a plurality of invitees, comprising:
- a computer-readable storage medium storing instructions; and
- a processor executing the instructions to:
  - determine whether an invitee of a conference event is a moderator of the conference event by executing instructions to:
    - compare an identifier associated with the invitee to a particular invitee designated by a flag in the conference event, the flag designating a particular invitee of the conference event as the organizer; and
    - designate the invitee as the moderator based on the identifier matching the particular invitee designated by the flag; and
  - automatically establish the conference event using a moderator code responsive to determining that the invitee is the moderator of the conference event.

27. The conferencing system of claim 26, comprising executing instructions by the processor to:
- determine whether a conference bridge designated for the conference event matches conference bridge data stored in one or more conference profiles associated with the invitee, the conference profiles storing conference bridge data; and
- select the moderator pass from the invitee's conference profile for use in automatically establishing the conference event.

28. The conferencing system of claim 27, wherein the conference bridge designated for the conference event includes a conference number and a participant code, but does not include the moderator code.

29. The conferencing system of claim 26, wherein an alternate invitee is designated as a moderator by issuing a new conference event designating the alternate invitee as the moderator.

* * * * *